Nov. 10, 1942.　　　　　J. NICOL　　　　　2,301,636
VEHICLE BODY BUILDING JIG
Filed Sept. 25, 1939　　　　9 Sheets-Sheet 1

Inventor
John Nicol
By Strauch & Hoffman
Attorneys

Nov. 10, 1942.　　　　　　J. NICOL　　　　　　2,301,636
VEHICLE BODY BUILDING JIG
Filed Sept. 25, 1939　　　　9 Sheets-Sheet 3

Inventor
John Nicol
By Strauch & Hoffman
Attorneys

Nov. 10, 1942.  J. NICOL  2,301,636
VEHICLE BODY BUILDING JIG
Filed Sept. 25, 1939  9 Sheets-Sheet 4

Inventor
John Nicol
By Strauch & Hoffman
Attorneys

Nov. 10, 1942. J. NICOL 2,301,636
VEHICLE BODY BUILDING JIG
Filed Sept. 25, 1939 9 Sheets-Sheet 7

Fig. 74

Inventor
John Nicol
By Strauch & Hoffman
Attorneys

Patented Nov. 10, 1942

2,301,636

UNITED STATES PATENT OFFICE 2,301,636

VEHICLE BODY BUILDING JIG

John Nicol, Detroit, Mich., assignor to Divco-Twin Truck Company, Detroit, Mich., a corporation of Michigan Application September 25, 1939, Serial No. 296,512

1 Claim. (Cl. 29—89)

The present invention relates to vehicle bodies and is more particularly concerned with metal delivery vehicle bodies and low cost quantity production methods and apparatus for constructing such bodies.

As disclosed in Fageol Patent No. 1,877,653, bodies for chassisless buses and delivery vehicles have been built around templates shaped to define the desired contour of the body framework. In this prior method of constructing bodies, the individual structural elements defining the body framework are bent or shaped to follow the contour of the template, upon which they are clamped. Then the elements are welded or otherwise secured together. The various body framework parts thus formed are then separately secured to the body base frame upon which the engine and running gear are mounted.

While this prior art method of construction is satisfactory for the building of chassisless vehicles in which the body framework supports the engine and other mechanism, it is not particularly adapted for the low cost, quantity production of smaller delivery and like bodies which are mounted on separate chassis of more or less conventional type carrying the vehicle running gear, to which this invention is especially applicable.

In the present invention, I have devised a novel low cost method of constructing commercial vehicle bodies wherein various portions of the body are substantially completely assembled independently as units apart from the assembly line so as to speed up body building operations.

Although the invention will be described as applied to so-called "standrive" vehicle bodies which are especially designed to be fitted to a drop frame chassis, it is apparent that the constructional methods and apparatus disclosed herein are applicable equally well to bodies mounted on standard chassis and also bodies of vehicles of so-called chassisless type.

With the above in mind, it is a major object of the present invention to provide novel methods of making vehicle bodies wherein separate body units are independently built upon separate accurately correlated jigs so that they later may be quickly assembled into a vehicle body. Specifically, the rear body floor, the body sides, the body front end, and the roof, are built on separate jig means as substantially integral units. The jigs upon which these units are assembled and made integral are designed to accurately locate the various interfitting and interengaging parts of the various units so that the units may be quickly fitted and attached to each other on the assembly line.

Another object of the invention is to provide novel, inexpensive, simple and efficient jig constructions for building the various body units in carrying out the novel methods of the invention.

Still another object of the invention is to provide a novel body side panel joint construction which is rust resistant and reenforces the panels.

A further object of the invention is to provide a novel vehicle body floor panel which is made of a suitable metal such as steel and preferably corrugated longitudinally to make it resistant to load stresses.

Further objects of the invention will presently appear as the description proceeds in connection with the appended claim and the annexed drawings in which

In general, each body unit is separately assembled upon independent jigs which are all designed to properly locate and hold the various elements comprising the respective units in position to be secured together in such a manner as to form uniform and interchangeable units that may be assembled rapidly and at low cost into substantially identical and interchangeable strong durable vehicle bodies.

These jigs comprise special racks or frames which are provided with suitable clamps for securely holding the elements together during bolting, welding or similar operations and these clamps are so located as not to interfere with such operations.

Each jib is adapted to present the unit in the position in which it may be most conveniently worked upon in the shop. Most of the jigs comprise tiltably mounted racks which are balanced, preferably by proper weight distribution, to enable the rack to be turned to any desired working position. In this manner the work is speeded up since a workman can comfortably reach all parts of the unit with maximum efficiency.

Figure 1:
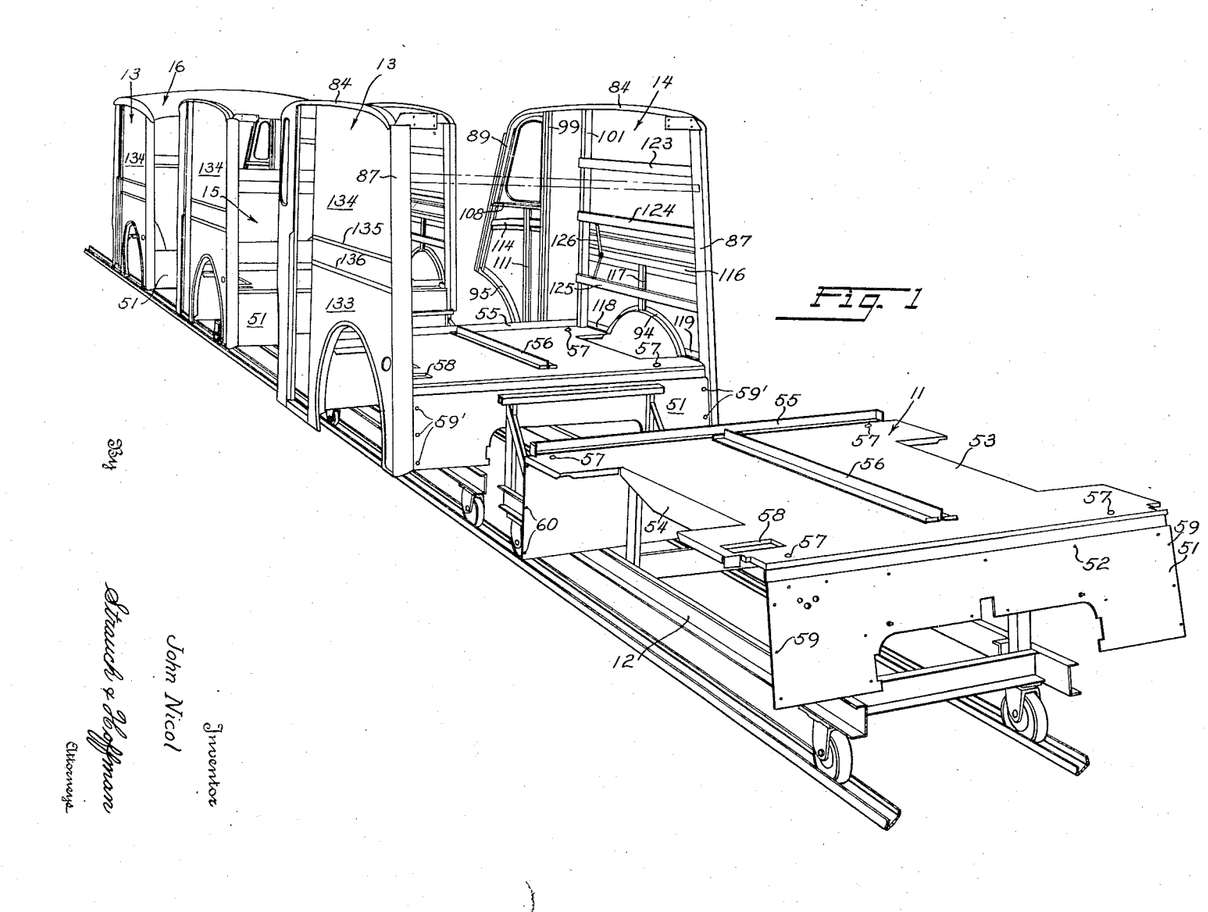
Figure 1 is a perspective view of the assembly line illustrating vehicle bodies in various degrees of completion according to the methods of the invention.

According to the present invention the rear body floor, the right and left body side units, the body front end and the roof after being independently built upon separate jigs, which are all designed and accurately corelated so as to produce body units which will accurately fit together, are quickly assembled on an assembly line such as that illustrated in Figure 1.

Referring to Figure 1, which illustrates four stages in the assembly of the vehicle body, assembly takes place along the assembly line in the following sequential order:

First, the rear body floor indicated at 11 is mounted upon a travelling support 12 which is provided with suitable stops (not shown) for centrally locating the body floor. The support is then pushed forward to the second stage of the assembly where the left and right body side units indicated at 13 and 14, respectively, are located in proper relation to the rear body floor and secured thereto. At the next stage, the front end unit 15 is secured in place between the front edges of the body side units. At the fourth stage, the roof unit indicated at 16 is bolted in place across the top of the body.

In describing the invention below, the manner in which each separate body unit is built upon its respective jig means will be described in detail, and then the manner in which these various units are secured together upon the assembly line will be described in more detail.

*Rear body floor assembly and jig*

Figure 2:
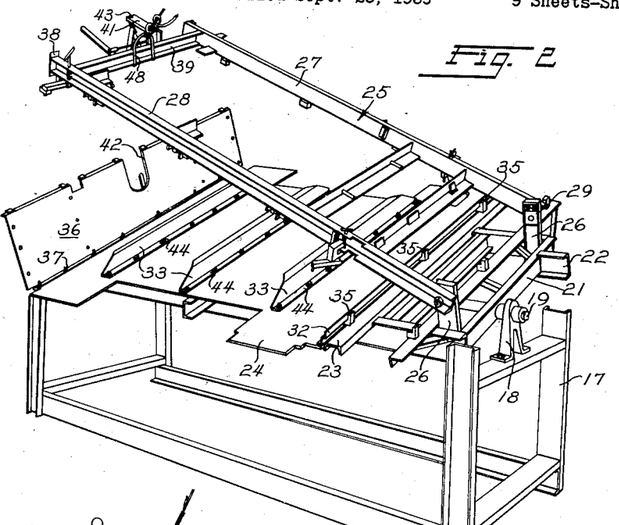
Figure 2 is a perspective view of a jig used for positioning and assembling elements to be attached to the rear body floor panel. The clamp frame for holding the elements in position is shown in raised position.
Figure 3:
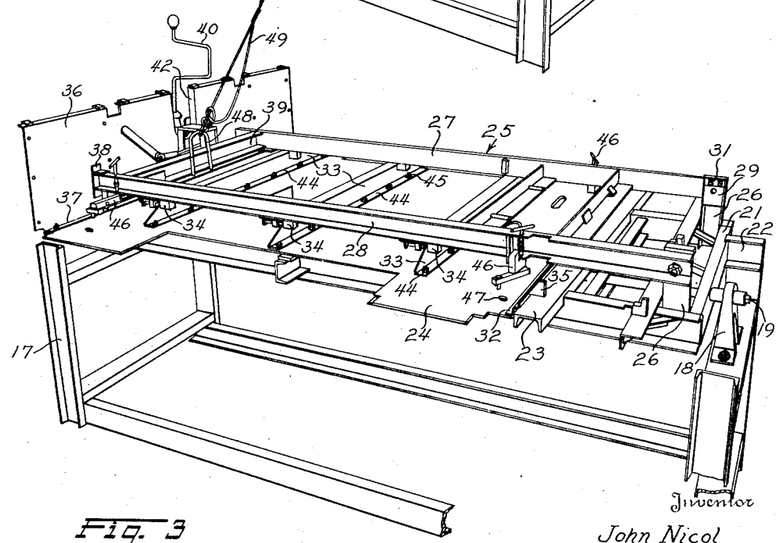
Figure 3 is a perspective view illustrating the jig of Figure 2 with the clamp frame lowered holding the elements in position to be secured upon the body floor panel.

Referring to Figures 2 and 3, the rear body floor assembly jig comprises a sturdy base frame 17 provided at opposite ends with bearing members 18 in which are journaled stub shafts 19 projecting from opposite ends of a jig rack 21. Base 17 is open at opposite sides to allow free tilting of rack 21, and an integral stop projection 22 is provided at one end of rack 21 for engaging the tops of opposite corner posts of the base frame as illustrated in Figure 2 for limiting rotation of the rack to approximately 180°. Preferably friction between shaft 19 and bearing support 18 and balanced distribution of the weight of the rack are sufficient to maintain the rack tilted in any desired angular position and, if desired, suitable means for holding the rack in such tilted position may be provided.

Rack 21 is provided with a transverse stop bar 23 for locating the front end of the rear body floor panel 24. Floor panel 24, in one embodiment, is made of laminated wood and is preferably cut to a desired pattern before being placed in the jig of Figure 2.

Clamp frame 25 comprises a pair of longitudinal bars 27 and 28 journaled in blocks 29 mounted for limited vertical movement in suitable guides on posts 26 upstanding from rack 21. This vertical movement is limited by stops (not shown) below the block and controlled by suitable springs 31 above the block so that body floor units of different thickness can be clamped upon the rack.

In assembling the rear body floor units, clamp frame 25 is raised to the position shown in Figure 2 and the pre-cut laminated wooden floor panel 24 is laid upon rack 21 in such a manner that its rear edge is pressed against the front edge of stop bar 23. Panel 24 is aligned laterally on the rack by means of stop bar 23 whose opposite ends are spaced a distance equal to the width of the rear edge of the panel 24.

With panel 24 in position, rear edge angle iron 32 and body cross sill members 33 are laid upon it transversely of the rack in approximately correct position. Clamp frame 25 is then lowered to the position shown in Figure 3 and the opposite ends of cross sills 33 are securely clamped in correct location between suitable clamps 34 located on the bottom sides of bars 27 and 28. Stops 35, distributed along the top of stop bar 23, serves to correctly position angle 32 along the rear edge of the floor panel.

After cross sills 33 have been located in proper position, the rear cross panel of the stand drive through aisle, indicated at 36, is positioned at the end of the rack opposite from hinges 29 with its attachment flange 37 lapping the front edge of panel 24. Panel 36 is correctly located with respect to panel 24 and the cross sills by means of abutment plate 38 which is rigid with the free end of the bar 28.

The free end of clamp frame 25 is provided with a rigid transverse bar 39 upon which is mounted an upstanding and forwardly projecting plate 41 adapted to extend through the propeller shaft tunnel aperture 42 in panel 36. Plate 41 is recessed at 43 to fit over a suitable threaded stud (not shown) on rack 21. A suitable nut adapted to be tightened by wrench 40 holds the frame 25 in the position shown in Figure 3 and plate 41 is forced against panel 36 to maintain it in upright position as also shown in Figure 3.

Angle 32, the panel engaging flanges 44 of cross sills 33 and flange 37 are all preferably provided with suitable bolt receiving holes before being positioned on panel 24. These holes in the flanges serve as guides for drilling cooperating holes in panel 24, and angle 32, cross sills 33 and panel 36 are then secured to the panel 24 by suitable bolts designated generally at 45.

Above opposite corners of panel 24, suitable drill guides 46 are removably secured to the bars 21 and 28. These drill guides, which may be shifted to any desired location along the bars, are provided for the purpose of locating and boring holes 47 which serve as drainage outlets for the floor panel as will later be described.

Bar 39 is provided with a rigid loop 48 to which is attached a cable 49 for lifting and holding the clamp frame 25 above rack 21 prior to assembly and after the angle iron 32, cross sills 33 and panel 36 have been bolted to the panel 24 as shown in Figure 2.

The various stops and clamps on the rack and clamp bar of the jig are designed to position angle 32, panel 36 and cross sills 33 in such relation that they will accurately interfit with corresponding parts of the frame or other body units to which they are to be attached upon the assembly line.

*Body side unit assembly and jig*

Figure 4:
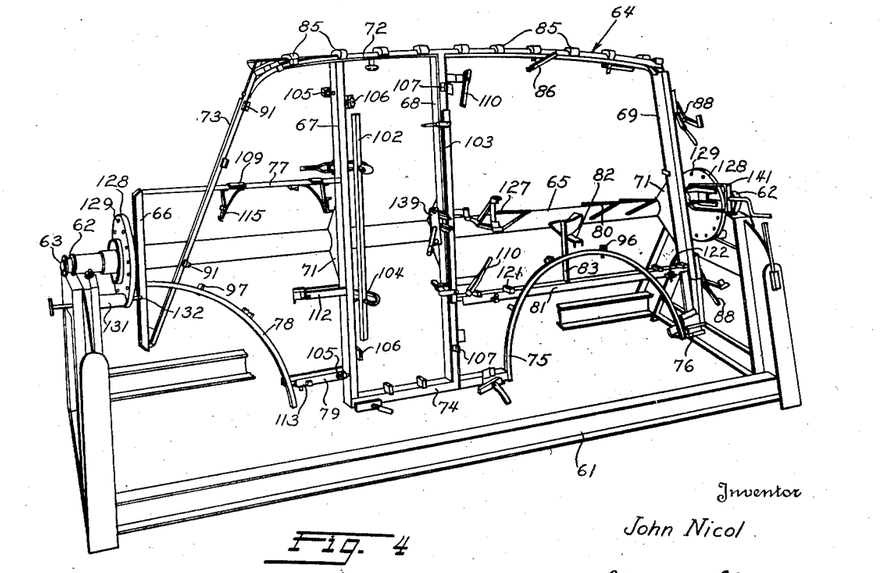
Figure 4 is a perspective view of the jig employed for assembling the body side units. This jig is employed for the left body side unit, the jig for the right side unit being merely reversed.
Figure 5:
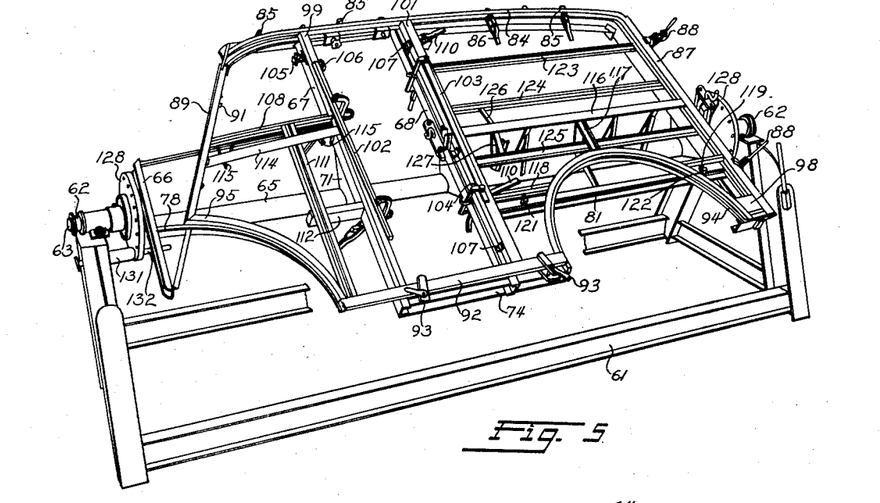
Figure 5 is a perspective view illustrating the job of Figure 4 with the structural elements comprising the skeleton frame of the body side unit clamped in position to be welded.

A preferred form of jig for building the left body side unit is illustrated at Figures 4 and 5. This jig comprises a relatively heavy base 61 at whose opposite ends are provided bearing supports 62 carrying stub shafts 63 projecting from opposite ends of the jig rack 64.

A longitudinal beam 65 which extends generally parallel to shafts 63, but axially displaced therefrom, extends the full length of rack 64 and serves as a support for the rack frame elements upon which the body side unit skeleton elements are to be clamped and welded.

This rack frame comprises rigid transverse bars 66, 67, 68 and 69 which are all rigidly supported upon beam 65, as by generally identical projections 71. Bars 67, 68 and 69 are designed to support the side door posts and the rear body post respectively of the body side unit. The upper ends of bars 67, 68 and 69 are bridged by a roof rail support bar 72, and a front body post support bar 73 extends from the forward end of bar 72 to the lower end of bar 66. The lower ends of bars 67, 68 and 69 are bridged by a lower body side rail support bar 74, an arcuate rear wheel housing angle support bar 75 and a clamp bar 76 extending from bar 75 to the lower end of the rear body post bar 69.

A front side window sill support bar 77 extends between bar 67 and the top end of bar 66; and, below bar 77, an arcuate front wheel housing angle support bar 78 and a short longitudinal clamp bar 79 extend between bars 66 and 67.

A longitudinal brace bar 81 extends between bars 68 and 69 beneath bar 75, as shown in Figure 4. Between bars 68 and 69, beam 65 is provided with a plurality of upstanding posts 82, one of which is connected to bar 75 by a short transverse bar 83. All of the bars comprising the above described rack 64 are preferably welded or otherwise substantially integrally united so as to provide a rigid unitary frame upon which the elements of the body side unit may be accurately positioned and secured together.

As a first step in building the body side unit, the elements comprising the skeleton frame thereof are clamped upon the above described rack as shown in Figure 5.

Roof rail 84 is secured upon bar 72 by means of a series of stop lugs 85 and spring clamps 86 pivotally supported upon bar 72. The rear body door post 87 is clamped in position by means of a series of arcuate spring clamps 88 on bar 69. Front body post 89 is clamped upon bar 73 by suitable clamps 91, and the lower body side rail 92 is held by clamps 93 in position bridged between the rear and front wheel housing angles 94 and 95 which are clamped upon arcuate bars 75 and 78 respectively as by suitable clamp means 96 and 97 (Figure 4) respectively on those bars. A plate 98, comprising a lower body side rail interconnecting angle 94 and the lower end of body post 87 is positioned and clamped upon bar 76 in a suitable manner.

Side door posts 99 and 101 are secured upon bars 67 and 68 respectively by identical elongated clamp jaws 102 and 103 which are hingedly supported upon the lower sides of bars 67 and 68 respectively. Jaws 102 and 103 are resiliently mounted, as by springs 104, to compensate for different sizes of door posts or minor irregularities in the same. Posts 99 and 101 are precut to proper length to interfit snugly between rails 84 and 92 and are positioned to define doorway space of proper width by means of suitable adjustable stops 105 and 106 on bar 67 and the rigid stops 107 and spring clamps 110 on bar 68.

Front window sill 108 is positioned on abutments 109 (Figure 4) projecting from bar 77 and is held thereon by the upper end of intermediate body post 111 which is firmly anchored to the rack by clamp 112, extending from bar 67, and clamp 113 (Figure 4) on bar 79. Panel brace 114 is also bridged between posts 89 and 99, overlying post 111, and being secured to the rack by suitable clamps 115 mounted on bar 77.

A longitudinal panel brace 116, adapted to be welded at its opposite ends to posts 101 and 87 is positioned and supported by posts 82, and this brace adapted to be midway of its length to the top of wheel housing angle 94 by a short post 117. Brace 116 and post 117 are securely held in position upon the rack by reason of being interfitted between the clamped posts and wheel housing angle and the rack bars, or separate suitable clamps may be provided for the purpose as desired.

Posts 68 and 69 are adapted to be connected to housing angle 94 by aligned structural angles 118 and 119 which are held in position for welding by suitable clamps 121 and 122 respectively at opposite ends of bar 81. Angles 118 and 119 are designed to locate the body side units for proper height with respect to the body floor during assembly as will later be described.

Rub rails 123, 124 and 125 are preferably laid upon the rack, in position indicated by suitable guide grooves or lines (not shown) before posts 101 and 87 are positioned and are thereby held firmly in position beneath those posts when the latter are clamped in place. Rub rails 124 and 125 are adapted to be connected to brace 116 by a suitable strap 126 which is maintained in position for welding thereto by a suitable clamp 127 outstanding from beam 65.

In the above described embodiment of the invention, a rack and clamping arrangement for assembling the skeleton frame of a body side unit of a delivery vehicle body of the type described in more detail in my copending application Serial No. 202,536, filed April 16, 1938, is set forth. The invention, however, is not limited to such specific construction and may be adapted for the construction of skeleton frames of any desired type. Moreover, any desired type of clamp means may be employed.

For practicing the invention, it is desirable that the rack be so balanced that it can be quickly turned and maintained in a given working position. Preferably, beam 65 is of such weight as to substantially counter-balance the weight of the rest of the rack including the frame unit clamped thereto.

At each end of the rack, a circular plate 128 having a series of circumferential apertures 129 is made rigid with stub shafts 63. A plunger guide 131, rigid with base 61, is provided with a plunger 132 which may be inserted into any selected aperture 129 for maintaining rack 64 in a desired angular position for clamping and welding the various elements thereupon. Plunger 132 may be rendered inoperative merely by withdrawing it from apertures 129 and locking it, as by the bayonet sleeve arrangement illustrated in Figure 6.

Preferably the plane of assembly of the skeleton frame contains the line joining the axes of shafts 63.

Employing the above described apparatus, a workman can assemble the whole skeleton frame of the body side unit without unnecessary labor and from substantially a single position. By mounting the clamps on the rack, no time is consumed in searching for lost or misplaced clamps thereby speeding up the operation considerably. The welding operations can likewise be carried out in the same efficient manner and, since the rack is tiltable, it is not necessary to employ long, cumbersome hoses in the welding equipment.

After the skeleton frame of the body side unit has been integrally united as by welding as above described, it can be stripped from the jig as a unit by merely loosening the clamps if desired. However, the jigs illustrated in Figures 4, 5 and 6 are especially designed to enable the body side panels, which are usually of sheet steel, to be clamped directly upon the skeleton frame and be welded thereto without removal of the latter from the jig.

The body panels, which have been stamped into proper shape, are laid upon the skeleton frame in position for welding thereto. Care is taken to loosen all clamps that might interfere with this operation but sufficient clamps are maintained operative to hold the skeleton frame firmly upon the rack. As shown in Figure 7, lower rear body panel 133 is substantially flat. Upper rear body panel 134 is formed with longitudinal moulding beads 135 and 136 and its lower end is reversely bent back upon its inner surface to provide a vertical tongue 137 designed to lap the upper edge of panel 133 and be welded thereto.

Figures 6, 7, 8:
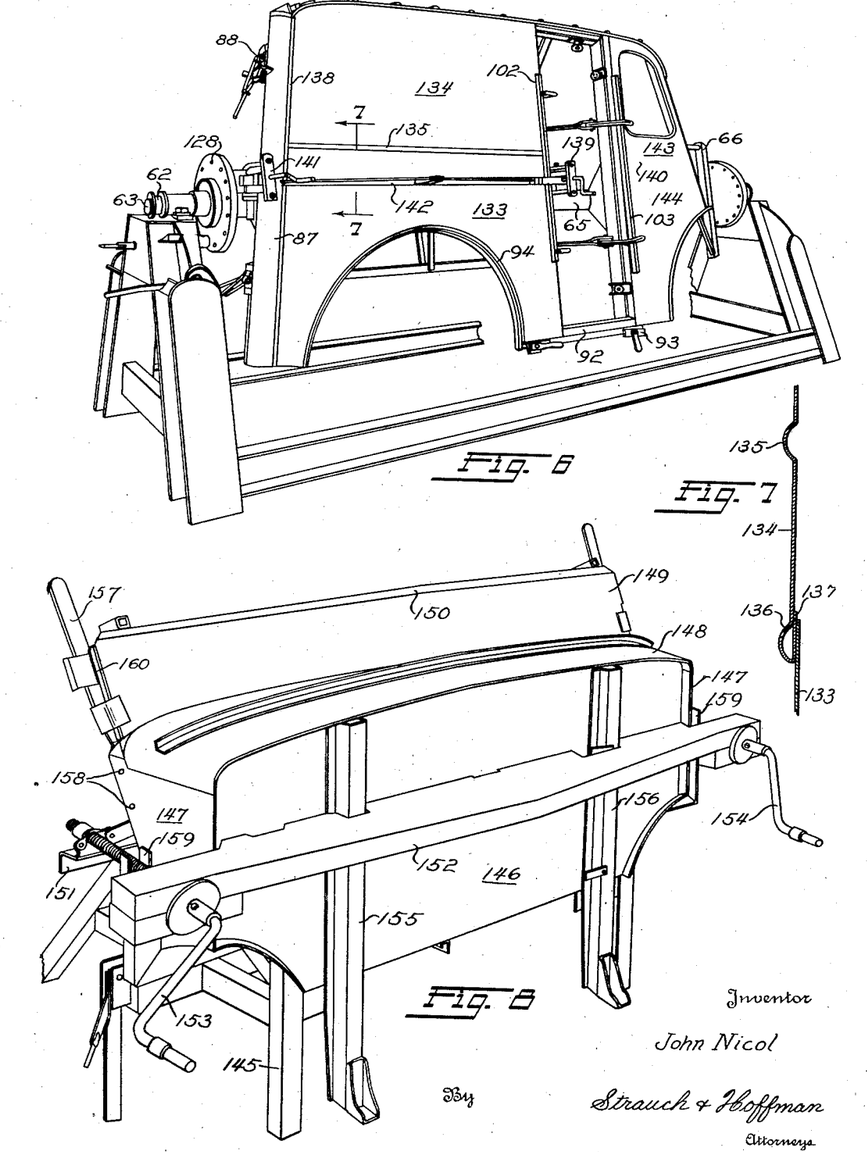
Figure 6 is a perspective view of a jig similar to that of Figure 4 but designed for assembling the right body side unit, after the body skeleton frame has been welded and the body side panels have been clamped in position to be welded upon the frame.
Figure 7 is a section through a body side panel taken generally along the line 7—7 in Figure 6 illustrating the novel construction of the panel joint.
Figure 8 is a perspective view of the jig means for clamping the elements of the front end assembly together to be welded into an integral unit.

With the panels in position, their perimetral edges are peened over or otherwise bent to overlie adjacent skeleton frame elements as indicated at 138 in Figure 6 and clamp jaw 102 is set to bridge both panels as shown in Figure 6. The resilient mounting of jaw 102 enables it to be used for clamping the panels without injury to itself or the body unit.

Suitable vise blocks 139 and 141, upstanding from beam 65 adjacent the rear body post and the rear doorway post respectively, are adapted to receive opposite ends of a clamp strap 142 designed to overlie bead 136 and insure tight engagement of tongue 137 and panel 133 during welding operations. Vise blocks 139 and 141 may be manipulated to compress the panels to a desired degree and generally insure that the panels and the skeleton frame are maintained in position for welding. The rack may be quickly tilted through 180° to gain access to the interior of the unit for welding tongue 137 and panel 133.

Front body side panels 143 and 144 are laid on the skeleton frame to provide a lapped joint at 140 and are held upon the frame by jaw 103 and by having their perimetral edges bent over the adjacent skeleton frame elements to which they are to be welded.

After completion of the panel welding operations all clamps are released and the completed body side unit is removed and ready for assembly upon the assembly line.

*Front end assembly and jig*

The jig illustrated in Figure 8 comprises a support 145 for mounting a dash panel 146, side cowl plates 147, and upper cowl plate 148 and a lower windshield panel 149. Dash panel 146 is rigidly clamped to the side cowl plates by means of a pair of bars 151 and 152 whose opposite ends are interconnected by the threaded cranks 153 and 154 respectively. Dash posts 155 and 156 are accurately located and pressed against the front surface of dash panel 146 by reason of their disposition in cut out portions of bar 152.

Windshield panel 149 is accurately centered in the assembly by means of suitable clamps 157 extending upwardly, at opposite sides of the jig, from bar 151. Suitable clamps (not shown) are also employed to secure an instrument board upon the inner side of the lower windshield panel. This instrument board is illustrated in Serial No. 202,536 and it is believed unnecessary to illustrate it in the present disclosure.

Cranks 153 and 154 are laterally positioned on support 145 in U-shaped guides 159 which enable the bars 151 and 152 to be lifted bodily over the top of the front end unit after it has been welded and the cranks have been loosened.

Side cowl plates 147 are each provided with a series of apertures 158 for bolting the unit to the front body posts and the side frame units as will be later explained.

Roof assembly and jigs

Figure 9:
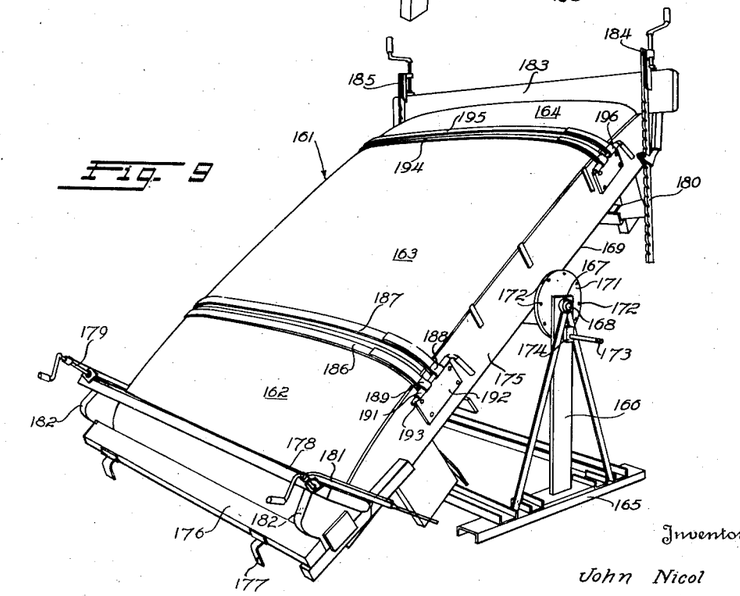
Figure 9 is a perspective view of a jig for holding the roof shell sections in position to be welded.
Figure 10:
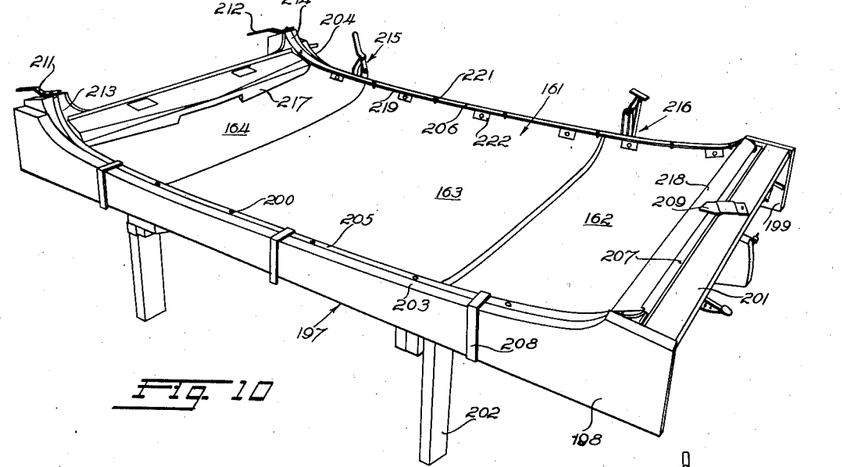
Figure 10 is a perspective view of a jig for clamping the front and rear headers and the side edge reenforcing strips to the roof shell after it has been welded together in the jig of Figure 9.
Figures 11, 12, 13:
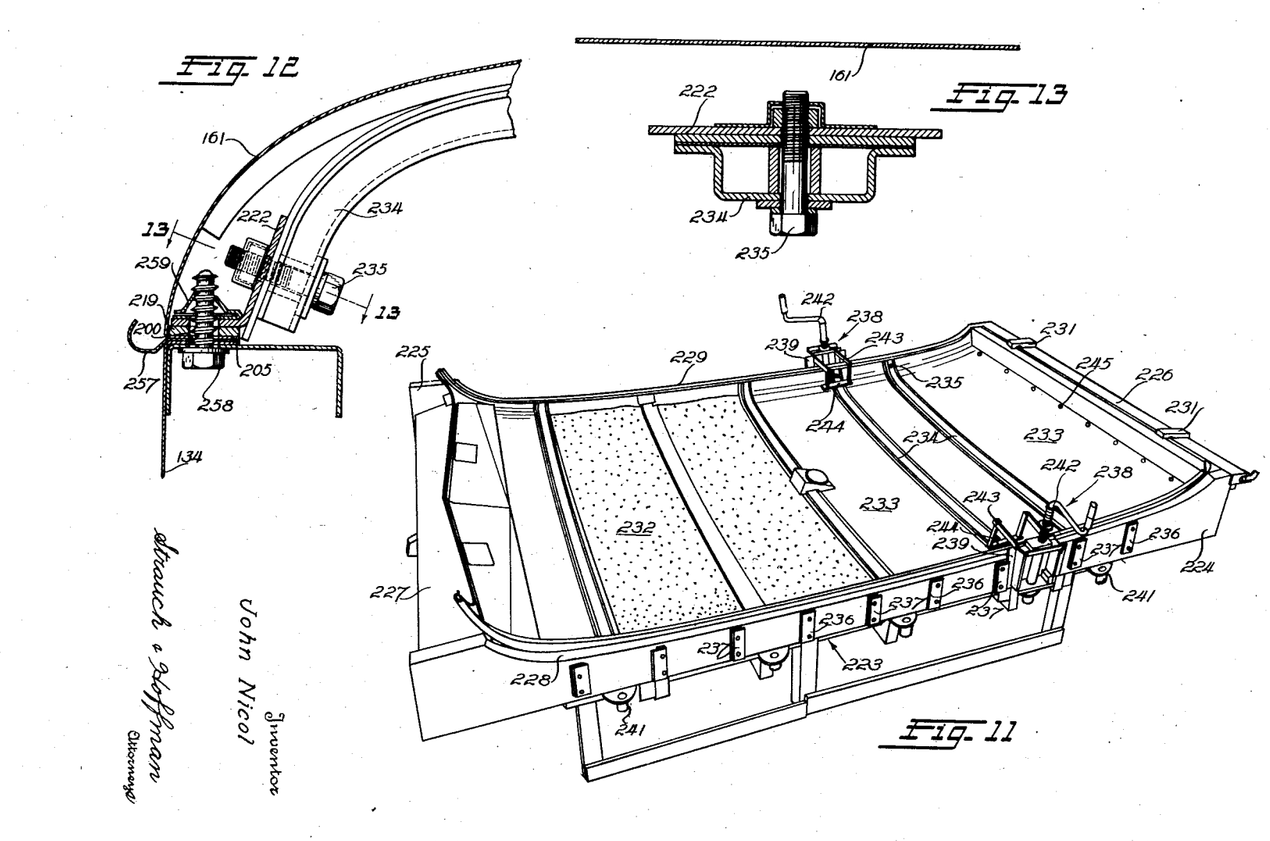
Figure 11 is a perspective view of a further jig for completing the construction of the roof unit, including clamps for locating and holding the liners and roof bows.
Figure 12 is a fragmentary sectional view illustrating the manner in which the roof is bolted to the top rail of each side unit.
Figure 13 is a section taken along line 13—13 of Figure 12 illustrating the manner in which the roof bows are secured at opposite ends.

Three jigs employed in progressive assembly of the roof unit are illustrated in Figures 9, 10 and 11 respectively.

The sheet metal roof shell 161 is preformed, as by stamping, in three separate sections consisting of rear section 162, intermediate section 163 and front section 164. The jig illustrated in Figure 9 is designed to clamp these sections together for welding into a single integral roof shell and comprises a base 165 having upstanding posts 166 at opposite sides provided with journal 167 for receiving pivot stubs 168 projecting from opposite ends of a tiltable jig rack 169. Rack 169 is of balanced design so that it can be easily and quickly manipulated and maintained in convenient working positions.

At opposite sides of the rack, stubs 168 are provided with circular plates 171 each having a series of circumferential apertures 172 designed to receive the plunger 173 slidably mounted in a guide 174 on post 166. Plunger 173 may be fitted into any of apertures 172 to retain rack 169 in a desired angular position.

Rack 169 comprises a pair of longitudinal side beams 175 whose opposite ends are connected by heavy end beams 176 to provide a rectangular bed in which the roof shell sections are placed with adjacent edges lapped for welding. Satisfactory results have been obtained employing a rack bed wherein the shell sections are supported only upon their edges by a suitable ledge running along the inner perimeter of the bed since the metal shell sections have considerable self-rigidity, but if desired a bed having its upper surface formed to the contour of the shell sections may be employed to insure full surface support for the latter.

End beams 176 are spaced to define proper length for the roof shell and are provided with stop legs 177 for engaging the floor for supporting the rack in its maximum tilted position illustrated in Figure 9.

Roof section 162 is clamped to the rack bed by a transverse beam 178 which is cut to fit snugly over the contour of the roof section and is held at opposite ends by suitable adjustable clamps 179 and 181 which may be tightened as desired to hold roof section 162 firmly on the bed. Beam 178 is supported and guided at opposite ends by suitable blocks 182 rigid with the rack in such a manner that, upon tightening of clamps 179 and 181, beam 178 is advanced substantially normally to the roof section surface.

Roof section 164 is clamped to the bed by a beam 183 which is similar to beam 178 and held at opposite ends by adjustable screw clamps 184 and 185. As shown at the top of Figure 9, one arm of clamp 184 comprises a ratchet bar 180 which is adjustable in effective length to accommodate roof sections of different sizes. Clamps 179, 181 and 185 are preferably substantially identical with clamp 184.

Roof section 163 is held on the rack with its opposite edges overlapping the other roof sections. A pair of rigid parallel straps 186 and 187 designed to follow the roof shell contour, extend across roof sections 162 and 163 respectively at opposite sides of the lapped joint. Straps 186 and 187 are provided at their opposite ends with integral hinge loops 188 and 189 respectively which are designed to be aligned with each other and a pair of hinge sockets 191 integral with a plate 192 secured upon the outer side of each side beam 175. Removable hinge pins 193, when passed through aligned hinge parts 188, 189 and 191, maintain the straps closely against the roof shell surface at opposite sides of the lapped joint which is exposed for welding.

Similar straps 194 and 195 are provided to bind roof sections 163 and 164 at opposite sides of the lapped joint therebetween in such a manner as to leave the joint exposed for welding. Straps 194 and 195 are preferably locked at opposite ends by removable hinge pin assemblies 196 similar to that at 193.

Shell 161, after removal from jig of Figure 9, is seated upside down in the jig bed 197 illustrated in Figure 10. Jig 197 comprises a pair of parallel side beams 198 and 199 bridged at one end of beam 201 and supported at a suitable height above the floor by legs 202. Side beams 198 and 199 are cut away intermediate their ends to provide arcuate surfaces 203 and 204 which are designed to be level with the opposite side flanges 205 and 206, respectively, of the roof shell.

Referring to Figure 10, shell 161 is inserted from the left side and advanced until its rear edge flange 207 abuts against beam 201. Angles 208, rigid with beam 197, and clamp 209, pivoted on beam 201, extend over flanges 205 and 207 to position the shell in its bed. At the open end of the bed, pivoted clamps 211 and 212 are designed to engage projections 213 and 214 of the shell (which are adapted to fit over the front body posts as will later be described) and hold the shell against lengthwise movement.

Additional suitable toggle clamps 215 and 216 are pivotally supported on beam 199 and are adapted to be swung down into engagement with the inner surface of the shell.

With shell 161 clamped as above described, front header 217 and rear header 218 are positioned and welded across the front and rear edges of the shell, each header being welded to the roof flanges at the respective ends.

Side flanges 205 and 206 are provided with rigid metal reenforcing strips 219 which, after being secured to the flanges as by bolts 221, are then welded thereto. Before being attached to the roof flanges, strips 219 are preferably provided with depending spaced roof bow lugs 222, which are preferably welded thereto. Bolts 221 are removed after the welding operation.

After removal from the jig bed of Figure 10, the roof shell 161 is placed on a suitable soldering bench (not shown) where the welded lapped joints between the roof sections are surface soldered, abraded and smoothed in such a manner as to provide a smooth, continuous external surface over the entire roof shell which is now an integral unit. This bench may be of any suitable design and illustration of the same is not deemed necessary.

Roof shell 161, with front and rear headers attached and the side flange reenforcing strips integrally united thereto, is placed in the jig bed 223 illustrated in Figure 11 after removal from the welding jig of Figure 10. Jig bed 223 comprises a generally rectangular frame made up of parallel side beams 224 and 225 and end beams 226 and 227. Side beams 224 and 225 are cut away intermediate their ends to provide arcuate surfaces 228 and 229 respectively following the contour of the roof shell side flanges, and end beam 226 is provided with suitable pivoted stop clamps 231 for locating and holding the forward rear edge of the roof shell in the jig.

While positioned in jig 223, shell 161 is lined with a suitable insulating material 232 which is held in place by sheet metal roof liner strips 233 whose adjacent edges are bridged by roof bows 234. As shown in Figures 11, 12 and 13 each roof bow 234 is secured at opposite ends to lugs 222 by bolt and nut assemblies 235 or equivalent fastening means.

In order to quickly and correctly position and hold roof bows 234 in proper location to be bolted to lugs 222, jig 223 is provided at opposite sides with aligned roof bow clamps. If desired a separate pair of clamps may be employed for each roof bow but I have found it preferable and more economical to employ only one pair of clamps which may be quickly shifted between suitable guide stations aligned with opposite ends of each roof bow.

In the illustrated embodiment of Figure 11, each side beam is provided with a pair of guide blocks 236 and 237 defining slide guide sockets adjacent opposite ends of the cross bows for receiving suitable clamps 238 mounted on slide plates 239. Below each slide guide, each beam is provided with a projecting ear 241 having a threaded aperture for receiving the threaded end of the clamp screw 242.

Each slide plate 239 is provided with a pair of inwardly and downwardly projecting arms 243 terminating in a bridge bar 244 adapted to engage the roof bow. Screws 242 may be manipulated to draw roof bow 244 into conformance with the roof contour and align the bolt aperture at the end of each bow with the corresponding aperture in each lug 222. Bolts 235 are then put in place and the clamps moved to the next roof bow.

Ears 241 not only support each clamp in its slide guide but serve as reaction members for the clamp screws. I have found it preferable to secure the roof bows in place in order from right to left in Figure 11, the right hand side of the rearmost liner plate being attached to the rear header 218 by suitable screws 245 or the like. It will be understood that all bolt and screw holes in the roof unit are formed in the various members prior to assembly in the jigs.

After the roof bows have all been bolted into the roof unit, it is ready to be attached to the remainder of the body as will later be described.

*Assembly of body units*

With reference to Figure 1, the substantially complete floor unit, removed from the jig illustrated in Figures 2 and 3, is mounted upon travelling support 12 and centrally located thereupon by suitable stops (not shown) cooperating with the cross sills 33. Here the depending rear apron 51 is secured to the unit along angle 32, as by bolts 52.

A sheet metal floor covering 53, preferably of galvanized or rust proof metal, is then laid over panel 24. Cover 53 is preferably bent over adjacent edges of the panel, especially at 54 adjacent the wheel housing apertures. A water dam rim 55 is then secured along the front edge of the panel and an inverted T-shaped, longitudinal ridge 56 is mounted centrally of the floor. Rim 55 and ridge 56 are preferably secured upon the floor by suitable screws, holes for which have been preformed in cover 53. Cover 53 has also been preformed with suitable drainage apertures 57, aligned over apertures 47 in panel 24, and with a cut-out position 58 lying over the gasoline feed pipe hole in panel 24.

At the next station in Figure 1, side units 13 and 14 are attached in substantially identical manner. With special reference to side unit 14 in Figure 1, it is accurately located for height with respect to the body floor by angles 118 and 119 (right and left body unit elements are designated by identical numerals) whose flat lower surfaces are adapted to rest flush upon flooring 53 at the side edge. These angles are rigidly attached to the floor by means of suitable screws or the like.

The side units are properly located longitudinally of the floor by reason of their accurate construction in the jigs of Figures 4–6 which insures that the lower end of the rear door post 101 will fit snugly against the rear surface of panel 36, to be secured thereto by bolts 60' (Figure 15) passing through suitable holes 60 (Figure 1) in the panel; and which also insures that the lower end of the rear body post 87 will interfit snugly with apron 51, being attached thereto by bolts 59' passing through holes 59 in the apron.

During assembly of the side units on the body floor, the former are correctly spaced and braced laterally by means of suitable brace bars extending between opposite corner posts 87 and opposite rear door posts 101. These bars are preferably simply wooden beams cut to proper length to fit between the posts, and for purposes of illustration one of them is indicated in dotted lines at 90 in Figure 1. A suitable overall clamp (not shown) is preferably employed to embrace the upper edges of the side units and keep the latter compressed against the ends of the spacer bars. This clamp is removed immediately after the floor unit has been bolted to the side units.

Forwardly of the side doorways, the front edges of the side units are spaced and aligned by a suitable jig 246 which also locates the front end assembly which has been assembled in the jig of Figure 8.

Jig 246 comprises a series of transverse bars 247 adapted to extend between inner sides of the opposite front body posts and a series of vertical bars 248 whose lower ends are adapted to engage and position the front end assembly for height.

Figure 14:
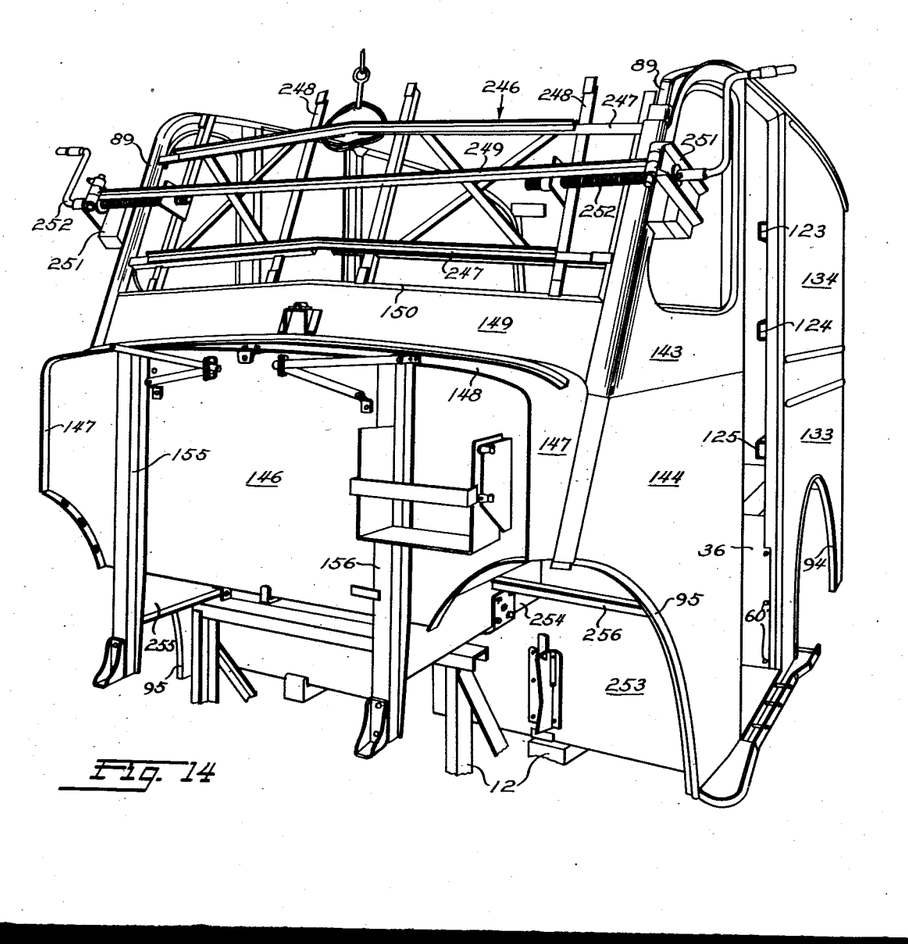
Figure 14 is an enlarged view in perspective illustrating suitable support and jig units for accurately spacing and locating the body side units and the front end units during assembly.

A central bar 249, rigid with the framework defined by bars 247 and 248, is provided at opposite ends with hinged blocks 251 for engaging the outer sides of the side units adjacent the front body posts as shown in Figure 14. Blocks 248 and bar 249 are provided with cooperating screws 252. During assembly, screws 252 are manipulated to draw in the front edges of the side units until they are properly spaced as evidenced by firm abutment with opposite ends of bars 247.

After the front edges of the side units have been spaced correctly and securely clamped the front end unit of Figure 8 is advanced therebetween until its windshield panel flange 150 abuts the lower ends of bars 248. In this position side flanges 160 on the windshield panel are in position to be welded to the front body posts 89 while the side cowl plates are also properly located to be secured to posts 99 as by bolts passing through apertures 158. When the front end unit is secured in this manner it maintains the front edges of the side units properly spaced after jig 246 has been removed.

Front cross panel 253 of the stand drive aisle, with longitudinal channels 254 and 255, secured thereto, is secured across the lower ends of opposite front door posts 99. Channels 254 and 255 are bolted at opposite ends to panel 253 and dash posts 155 and 156 respectively, being longitudinally aligned with the latter.

As shown in Figure 14, a short cross member 256 extends between channel 254 and a structural member, preferably post 111, of the side unit. A similar cross member (not shown) is provided at the other side of the body. These cross members are correctly positioned for welding at opposite ends by means of a suitable flat gauge (not shown) fitting against panel 253.

With the side units and the front end unit in place the completed roof unit, as taken from the jig of Figure 11, is positioned across the top of the body. The roof side flanges 205 and 206 are first bolted to the top side rails 84 of the respective side units. Apertures 260 (Figure 11) in these flanges are spaced to align with similar apertures in the top side rails. Referring to Figure 12 which illustrates the joint between the roof and side units, a water ledge strip 257 is preferably inserted between the inturned roof flange 205 and the inturned edge of panel 134. Bolts 258, passing through holes 200 and aligned apertures in the other elements and provided with suitable lock nut arrangements at 259, may be tightened to draw the joint elements into substantially water tight relation.

Figure 15:
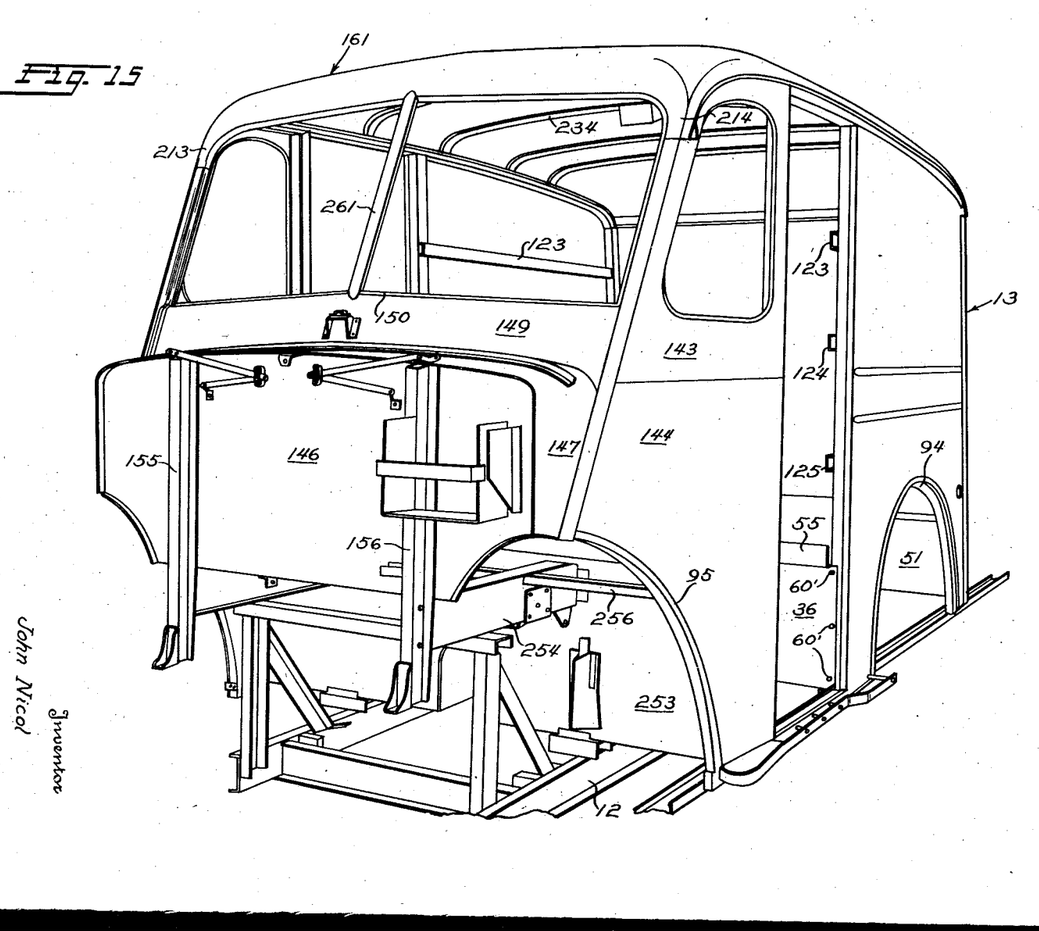
Figure 15 is an enlarged perspective view illustrating the substantially complete body after the roof has been secured in place and the central windshield brace welded between the roof and front end units.

Projections 213 and 214 of shell 161 fit in sleeve-like manner over the upper ends of front body posts 89 into abutment with upper edges of panels 134 to which they are welded after the roof unit has been bolted in place, as shown in Figure 15.

With the roof secured in position, assembly of the major portion of the body is completed by building in the central windshield brace 261 (Figure 15). A suitable jig (not shown, but similar to that illustrated in Figure 14 at 246) is employed to position and hold brace 261 centrally of the body with its opposite ends engaging the roof unit 16 and flange 150 of the lower windshield panel for welding thereto.

After the windshield brace is welded into the body, the side doors (not shown) are attached in a suitable manner and the joints between panels 143 and 149 and panels 144 and side cowl plates 147 are welded and smoothed to make them water-tight and improve the appearance of the body front end. The body is then ready to be mounted upon a drop panel chassis such as that disclosed in Serial No. 202,536.

The above described body building methods are especially suited for quantity production due to the fact that the various units (roof, side, front end, floor) are substantially identical and interchangeable so that there is no delay in selecting and fitting the units into place on the assembly line.

It will be understood that the invention is not restricted to the above illustrated types of jigs or clamps, but can be embodied in constructing substantially any type of all metal vehicle body.

Modified rear body floor

Figures 16, 17, 18, 19, 20:
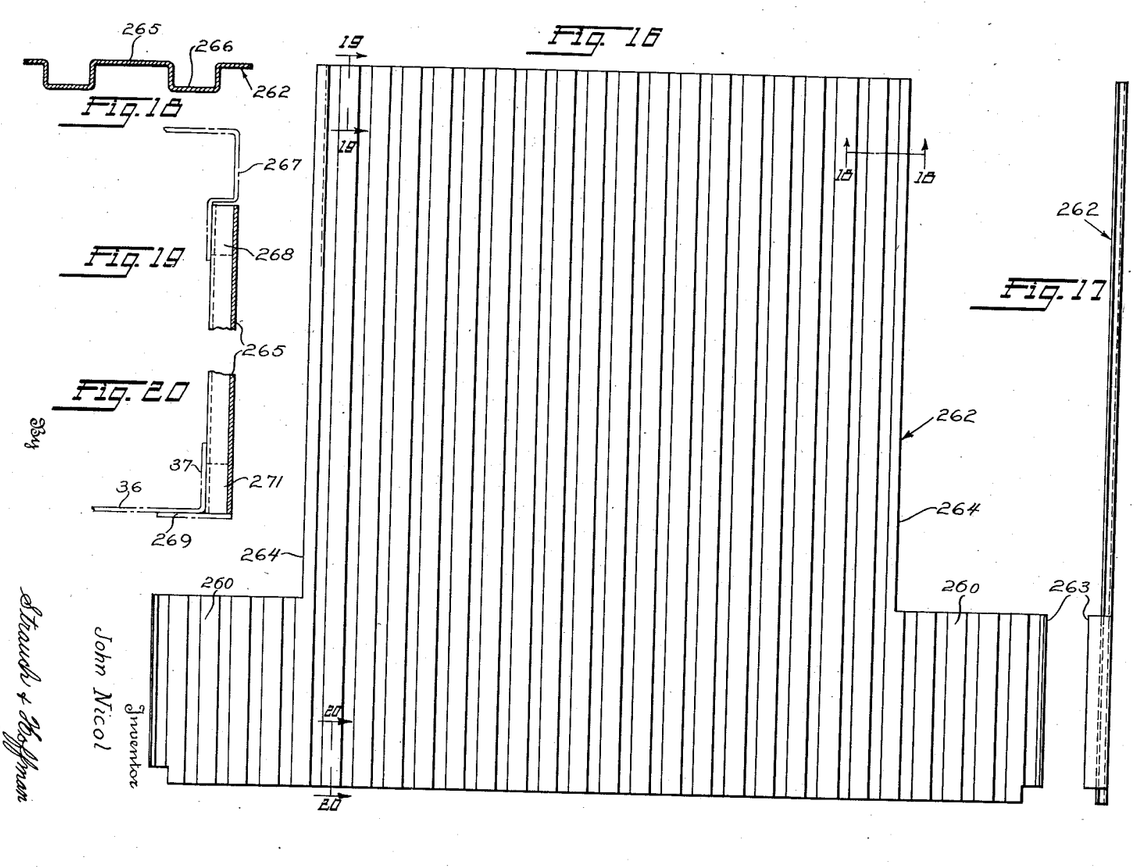
Figure 16 is a top plan view of a novel corrugated metal floor panel which may be employed in the rear body floor in place of the floor illustrated in Figures 1, 2 and 3.
Figure 17 is a side elevation of the metal floor panel of Figure 16.
Figure 18 is a section taken along line 18—18 in Figure 16 illustrating the nature of the corrugations in the floor panel.
Figure 19 is a section taken along line 19—19 in Figure 16 illustrating the manner in which the rear edge of the floor panel is sealed against the entry of dirt and dust.
Figure 20 is a section taken along line 20—20 in Figure 16 illustrating the manner in which the front edge of the floor panel is supported and sealed against the entry of dust and dirt.

If desired floor panel 24, illustrated in Figures 2 and 3, may be replaced by corrugated metal (preferably steel) flooring inserts, one of which is illustrated at 262 in Figure 16.

Panel 262 is provided with front side flanges 263 (Figure 17) which may be bolted or otherwise suitably secured to the inner front sides of the body side units and is formed with lateral wheel housing recesses 264 as illustrated in Figure 16.

Referring to Figures 16 and 18 the panel corrugations preferably extend longitudinally of the body and comprise parallel floor level portions 265 spaced by parallel recesses 266. The corrugation walls are substantially normally disposed with rounded corners and of a depth equal to about one half the width of each recess. It has been found that panels whose portions 265 are about one and one-half inches in width and are spaced by one inch wide recesses are especially suitable for steel vehicle body floors.

Projecting front floor corners 260 at opposite sides of panel 262 forwardly of the wheel housings may be made integral with panel 262 as illustrated, but preferably are provided as separate inserts. Similarly separate rear floor corner inserts of suitable shape and size may be provided behind the wheel housing recesses at the rear corners of panel 262. Panel 262 and the other inserts are preferably secured in place by being spot welded to each other and adjacent chassis and body frame elements.

Figure 19 illustrates the manner in which the rear edge of panel 262 may be sealed against the entry of dust and dirt where it is supported by a suitable body cross sill 267. The open ends of the corrugations below floor portions 265 are filled in by means of suitably shaped blocks of sponge rubber 268 which seal the space between sill 267 and floor portions 265. Similar rubber blocks may be employed to fill in the ends of recesses 266 if desired, and all of the rubber blocks employed are preferably permanently bonded to adjacent metal surfaces by a suitable water proof cement.

As illustrated in Figure 20, the front edge of panel 262 rests on flange 37 of panel 36 to which it is bolted or otherwise suitably fastened. The open ends of the corrugations are preferably closed by a rigid metal strip 269 secured to panel 36 and the joint further sealed by employing rubber filler blocks 271 similar to those at 268.

Substitution of the above described corrugated metal floor for the wood and metal floor of Figures 2 and 3 does not change the methods of the invention, involving only a change in the specific manner of assembly of the rear body floor unit.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In a jig for building a vehicle body side unit, a stationary base, a rack tiltably mounted on said base comprising a longitudinal beam, axially aligned pivots on opposite ends of said beam, means on said stationary base supporting said pivots for rotation, the portion of said beam intermediate said pivots being offset from the axis of said pivots and therefore being offset from the axis of tilt of said rack, supports extending from said offset beam portion toward the axis of said pivots, a plurality of rack frame members mounted on said supports at such a location with respect to the weight of said offset beam portion and the axis of tilt of said rack that said offset beam portion acts as a counterbalance for said rack frame members, and a plurality of clamp devices on said rack frame members for holding structural elements of said side unit in assembled position.

JOHN NICOL.